United States Patent [19]

Baugher

[11] 4,098,913
[45] Jul. 4, 1978

[54] GELATINIZED FAT PARTICLES

[75] Inventor: William Lewis Baugher, Logan Township, Dearborn County, Ind.

[73] Assignee: The Procter & Gamble Company, Cincinnati, Ohio

[21] Appl. No.: 735,361

[22] Filed: Oct. 26, 1976

Related U.S. Application Data

[63] Continuation of Ser. No. 605,471, Aug. 18, 1975, abandoned.

[51] Int. Cl.$^2$ ............................ A23D 5/00; A23J 3/00
[52] U.S. Cl. ................................... 426/104; 426/573; 426/601; 426/656; 426/652; 426/802
[58] Field of Search ................ 426/104, 98, 573, 574, 426/601, 656, 652, 802

[56] References Cited

U.S. PATENT DOCUMENTS

| | | | |
|---|---|---|---|
| 3,615,651 | 10/1971 | Parks | 426/511 X |
| 3,658,550 | 4/1972 | Hawley | 426/574 |
| 3,919,435 | 11/1975 | Feldbrugge et al. | 426/574 |
| 3,935,319 | 1/1976 | Howard | 426/601 X |

FOREIGN PATENT DOCUMENTS

| | | |
|---|---|---|
| 824,057 | 7/1975 | Belgium. |
| 7,401,154 | 3/1976 | France. |

*Primary Examiner*—Raymond N. Jones
*Assistant Examiner*—Esther M. Kepplinger
*Attorney, Agent, or Firm*—George W. Allen; John V. Gorman; Ronald L. Hofer

[57] ABSTRACT

Irregularly shaped, gelled fat particles are made by admixing a triglyceride fat or oil and a gelling agent with heating and then gelling the mixture by cooling with agitation. The gelled, irregularly shaped particles have a chewy texture and are incorporated into meat analog products resembling comminuted natural meat.

5 Claims, No Drawings

GELATINIZED FAT PARTICLES

REFERENCE TO RELATED APPLICATION

This appliction is a continuation application of co-pending application Ser. No. 605,471 filed Aug. 18, 1975 now abandoned.

Field of the Invention

This invention relates to gelled, irregularly shaped discrete particles containing fat and a gelling agent and to meat analog products, such as those simulating comminuted natural meat, incorporating the particles.

The Prior Art

Much research and development has been conducted in an effort to produce inexpensive food products which can serve as a substitute for natural meat in the diet of man. Several meat analog products are already commercially available. However, the technology in this field has not yet been developed to the point where such products are both inexpensively made and generally accepted by the consumer as being equivalent to natural meat products.

One problem detracting from most prior art products is the lack of a distinctive fatty taste and texture such as is characteristic of natural meat. Methods of providing the fatty taste and texture of natural meats include coating the vegetable protein with fat or with emulsified fat. The method of U.S. Pat. No. 3,658,550, issued Apr. 25, 1972 to Hawley, for producing an artificial adipose (fat) tissue for use in meat analogs, is to entrap fat in small discrete droplets in an alginate gel matrix. U.S. Published Patent Application B395,496, of Feldbrugge et al. published Jan. 28, 1975 (under Trial Voluntary Protest Program - 9230.6.2, June 4, 1974), now U.S. Pat. No. 3,919,435, discloses the encapsulation of fat or oil in a polymeric, carbohydrate gel to provide discrete particles or pockets of fat or oil in a meat analog. And U.S. patent application Ser. No. 473,544 of Howard filed May 28, 1974, now U.S. Pat. No. 3,615,651, discloses meat analogs comprising a mixture of edible protein fibers and a stabilized fat consisting of edible triglyceride and ethyl cellulose.

The present invention provides an improved process for adding fat to meat analog products, particularly those meat analog products simulating comminuted natural meat. It is an object of this invention to provide a texturized fat which exhibits characteristics of good chewy mouth feel and natural meat-like quality when incorporated into a meat analog product. It is another object of this invention to provide a meat analog product having the chewy texture and mouth feel of a comminuted natural meat product such as sausage or hamburger. It is still another object of the present invention to provide an improved method by which liquid fat or oil can be incorporated into meat analog products and substantially retained by the analog during cooking.

SUMMARY OF THE INVENTION

This invention relates to discrete, irregularly shaped, gelled fat particles, the method by which they are made, and meat analog products incorporating the particles. The discrete, irregularly shaped gelled fat particles are made by the process of:

(a) mixing 100 parts of a triglyceride fat and from about 2 parts to about 20 parts of an oil-soluble gelling agent above the temperature of gelatinization; and (b) cooling the mixture to a temperature below the temperature of gelatinization while maintaining agitation thereof, thereby providing discrete irregularly shaped particles of gelled fat.

Meat analog products simulating comminuted natural meat can incorporate the discrete, irregularly shaped gelled fat particles in a weight ratio of gelled fat particles to protein of from about 1:20 to about 10:1.

DESCRIPTION OF THE INVENTION

It has been discovered that fat can be processed to make it particularly suitable for incorporation into meat analog products which simulate comminuted natural meat products, e.g. hamburger, ground beef, ground round, ground sirloin, ground ham, or sausage. In accordance with the present invention, the fat is in small, discrete, irregularly shaped particles and in a form which does not substantially melt or dissolve and flow out of the product when the product is cooked. By this means, the fat found in comminuted natural meat is simulated. It has been discovered that suitable fat particles are provided by a process in which the fat is processed in accordance with the following steps:

(a) mixing 100 parts of a triglyceride fat and from about 2 parts to about 20 parts, preferably from about 4 parts to about 10 parts, of an oil-soluble gelling agent at a temperature above the temperature of gelatinization; and (b) cooling the mixture to a temperature below the temperature of gelatinization while maintaining agitation thereof, thereby providing discrete irregularly shaped particles of gelled fat.

The agitation required during the cooling of the oil-gelling agent mixture is required to form the desired discrete particles of irregularly shaped gelled fat. These particles have a surprisingly chewy texture which is not obtained if the mixture is cooled and gelled without agitation and then comminuted. Agitation employed in accordance with the present invention is effective to make particles of gelled fat which have the texture and mouth feel of natural fat tissue such as that a ground natural beef or hamburger.

The exact degree of agitation is not critical but the agitation must be great enough to produce the desired results. The agitation may be provided, for example, by mechanical or gaseous means. Excellent results are obtained by rapidly stirring the mixture while cooling and gelatinization take place. Alternatively, a stream of gas may be passed through the mixture during the cooling, gelatinizing step. However, it has been discovered that a preferred means of agitation involves the addition of water to a fat-gelling agent mixture which is above the boiling point (temperature) of the water. Upon contact, the water is changed to steam thereby effecting vigorous agitation and at the same time contributing to the cooling of the mixture by removing heat.

it is preferred, for optimum results, that the cooling of the mixture be carried out more rapidly than the cooling rate obtained by merely allowing the mixture to dissipate heat into air at room temperature. Thus, it is preferred that some cooling means be employed to effect relatively rapid cooling. This may be effected by placing a container holding the mixture in an ice bath. Other means for effecting cooling of the mixture will be readily apparent to those skilled in the art. Of course, considerations such as the quantity of the mixture will influence the choice of cooling means. The rapidity with which cooling takes place, as well as the violence of the agitation, can vary while still yielding satisfactory results. It is believed that the parameters are best determined by the results obtained thereby. The cooling, as well as the agitation, need only be sufficient to provide discrete, irregularly shaped gelled fat particles.

The temperature at which the triglyceride fat and gelling agent are mixed prior to the cooling and agitation step must be sufficiently high to be above the temperature at which the mixture gels; that is, the mixture will be comprised of liquid fat or oil and liquid gelling agent. Triglyceride fats suitable for use in the present invention are those vegetable fats or oils which are edible and otherwise suitable for use in foods. A significant advantage of the present invention is that it facilitates the use of fats or oils which are normally liquid at room temperature in meat analog products. These liquids, normally unacceptable for incorporation into meat analogs because they tend to leak out of the analog, can be utilized herein because they are employed in a gelled, more stable form and are substantially retained in a meat analog product during its intended use.

Suitable fats include cottonseed oil, soybean oil, coconut oil, rapeseed oil, peanut oil, olive oil, palm oil, palm kernel oil, sunflower seed oil, rice bran oil, corn oil, sesame seed oil, safflower oil, wallflower oil, nasturtium seed oil, whale oil, sardine oil, herring oil, menhaden oil, pilchard oil, lard, tallow and the like. Preferred fats are cottonseed oil, soybean oil, peanut oil, corn oil, lard and tallow.

The gelling agents which may be employed in this invention are those edible, oil-soluble compounds capable of forming a gel with fat or oil. Furthermore, the gel form must be maintained at the temperatures of use of the discrete, irregularly shaped gelled fat particles. Thus, suitable gelling agents are those which are capable of maintaining the gel form at the temperatures at which the analog will be subsequently subjected. Thus, if the analog is not cooked or otherwise subjected to high temperatures, suitable gelling agents include those which are capable of maintaining a gel only at relatively low (room) temperatures. In this case the temperature at which the gelling agent is effective to maintain a gelatinized structure need only be up to room temperature, i.e. about 32° C. On the other hand, analogs intended for subsequent cooking require a gelling agent which maintains a gel up to a higher temperature, the exact temperature depending upon the temperature of cooking to which the particles are to be subjected. Thus, if the particles are boiled, this temperature would be about 100° C. If the particles are to be fried, this temperature may be about 215° C.

The preferred gelling agent is ethyl cellulose; most preferably ethyl cellulose having a viscosity of from about 50–200 centipoises at 5% concentration in 80:20 toluene:ethanol at 25° C.

Of course, additional ingredients can be added to the fat-gelling agent mixture, to the protein portion, or as additional ingredients to the gelatinized fat-protein meat analog product. Suitable additional ingredients include, but are not limited to: flavorings, spices, coloring agents.

The discrete gelled fat particles can be added as the complete or partial fat portion of meat analog products which resemble comminuted natural meat. If desired, the particles can be added to natural meat, for example, in conjunction with a hamburger extender. The non-fat portion of the meat analog can be made by any of the conventional methods for simulating comminuted natural meat. It is, of course, contemplated that the non-fat portion will comprise primarily protein. It is further contemplated that the meat analog product will have a gelled fat particle to protein ratio of from about 1:20 to about 10:1. Conventional methods for simulating comminuted natural meat include methods for simulating comminuted natural meat include methods which produce such products directly and methods which produce products which are then comminuted to simulate comminuted natural meat.

Suitable processes for providing the protein portion of the products of the present invention are those disclosed in, for example, U.S. Pat. Nos. 3,102,031, Aug. 27, 1963, to MacAllister et al.; 2,874,049, Feb. 17, 1959, to Pader; 3,870,805, Mar. 11, 1975 to Hayes et al.; 3,836,678, Sept. 17, 1974 to Leidy et al.; and U.S. patent application Ser. No. 523,649 of Bates and Tarr filed Nov. 13, 1974, for "Process For Preparing Texturized Vegetable Protein".

The following examples further illustrate the present invention.

Example 1

Eight grams of ethyl cellulose (available from Hercules Chemical Co. under the trade name Ethyl Cellulose and having a viscosity of 100 centipoises) and 92 g. of partially hydrogenated cottonseed oil are mixed with rapid stirring in a glass beaker at a temperature of 180° C. At this temperature the mixture is in liquid form. Then the glass beaker is placed in an ice bath and 4 g. of water is immediately added by inserting a pipette into the ethyl cellulose-oil mixture and slowly releasing water through the pipette into the mixture. Upon contact with the mixture, the water changes to steam and provides vigorous agitation to the mixture while removing heat therefrom. (Note: caution must be used to avoid injury from hot oil splashing out of the beaker.) By this means, the mixture is cooled to a temperature below that of gelatinization while the mixture is simultaneously agitated. As the mixture gels, discrete, irregularly shaped gelled fat particles are formed whereupon the cooling and agitation are discontinued.

EXAMPLE 2

The following example demonstrates the incorporation of gelled fat particles of the present invention in a meat analog product. Five hundred grams of the product of Example 1 are intermixed with 1000 g. of a meat analog product made in accordance with the following procedure:

The following ingredients are mixed into a dough in a conventional Hobart mixer for 3 minutes:

| Ingredients | Grams |
| --- | --- |
| Defatted, deflavored soy flakes (5% moisture) | 1053 |
| Flavorings | 78 |
| Nutrients (vitamins, salt) | 1 |
| Water | 462 |
| | 1594 |

After mixing, the dough is rolled to a 0.012 inch sheet thickness using an 8-inch diameter 2-roll Farrell mill. The roll speeds are 36 and 41 feet per minute, providing a 14% differential to aid in product transfer. The sheet coming off the mill is comminuted in a cutter into pieces approximately ½ × 1 inch so as to facilitate cooking. The material is then placed in a conventional autoclave and cooked at 240° F under a saturated steam atmosphere (100% quality steam) at 10 psig for 10 minutes. After cooking, the material is air-dried in a conventional oven at 190° F for 2 hours to approximately 3% moisture to achieve biological stability. The texturized vegetable protein is ground and sieved to achieve a final particle size between 8 and 20 mesh (U.S.).

EXAMPLE 3

The product of Example 2 when rehydrated by admixture with twice its weight of water resembles comminuted ground beef, such as hamburger. The rehydrated admixture can be partially or wholly substituted for ground beef in casseroles, spaghetti sauces, chili and the like. The resulting products are similar to those containing natural ground beef, i.e. hamburger, in taste, texture and cooking properties.

EXAMPLE 4

Gelled fat particles are made as in Example 1 except that during the cooling step a stirring bar provides additional agitation of the ethylcellulose-oil mixture while the water is added by means of a pipette, and 0.5 g. of oil-soluble flavoring agent made in accordance with Example 1 of U.S. Pat. No. 3,930,046 Dec. 30, 1975 of Baugher for "Process for Preparing A Meat Flavoring", is added to the fat-ethylcellulose mixture prior to the step of cooling with vigorous agitation. This product is then incorporated into texturized protein material made in accordance with Example 2. The resulting product has a meat-like flavor which is retained in the mouth for a time analogous to the flavor retention time of natural meat flavor.

EXAMPLE 5

One hundred g. of partially hydrogenated soybean oil is mixed with 7.5 g. of the Ethyl Cellulose of Example 1, in a glass beaker at a temperature of about 180° C. The glass beaker is then placed in an ice bath and vigorously stirred by means of a hand-held glass stirring rod until discrete, irregularly shaped gelled fat particles are formed.

EXAMPLE 6

For purposes of comparison, two gelled fat products are made. First, gelled fat particles are made as in Example 1.

Second, another gelled fat product is made as in Example 1 except that during the cooling step, agitation is not practiced. The resulting gelled fat is a homogeneous slab of gelled fat. This slab is then comminuted into second particles which are about the same size as the first particles.

In comparison to the first particles, the second particles have less texture, and a more oily mouth feel and taste. When the second product is substituted for the first product in a comminuted meat analog, the resulting product has a more slippery, greasy mouth-feel and is inferior in that fat easily leaks from the gel upon handling and cooking, thus removing fat and any flavors contained therein from the meat analog product. Moreover, when mixed with a dry analog, the fat leakage coats the protein of the analog thus increasing the time required to rehydrate the dried analog product.

What is claimed is:

1. The process of texturizing fat for use in meat analog products comprising:
   (a) mixing 100 parts of a triglyceride fat and from about 2 to about 20 parts of an oil-soluble gelling agent which is ethyl cellulose having a viscosity of from about 50 to about 200 centipoises, at a temperature above that of gelatinization;
   (b) cooling said mixture to a temperature below that of gelatinization while simultaneously agitating said mixture, said simultaneous cooling and agitation being effected by the addition of water to said mixture in order to form agitating steam within said mixture, thereby providing discrete, irregularly shaped particles of gelled fat.

2. The process of claim 1 wherein the triglyceride fat is selected from the group consisting of soybean oil, cottonseed oil, peanut oil, corn oil, lard and tallow.

3. The process of claim 1 wherein said mixture has a temperature of gelatinization of greater than about 100° C.

4. A product made in accordance with the process of claim 1.

5. A meat analog product which simulates comminuted natural meat comprising:
   (a) from about 1 to about 10 parts of discrete, irregularly shaped particles made in accordance with claim 1; and
   (b) from about 1 to about 20 parts of edible protein.

* * * * *